United States Patent [19]

Lambracht

[11] Patent Number: 4,771,871
[45] Date of Patent: Sep. 20, 1988

[54] LUGGAGE WITH SELF-CONTAINED CONVERTIBLE WHEELED CARRIER

[76] Inventor: Rudolf Lambracht, 71 Old Ridge Rd., New Milford, Conn. 06776

[21] Appl. No.: 67,829

[22] Filed: Jun. 30, 1987

[51] Int. Cl.[4] .......................... A45C 5/14; A45C 9/00; A45C 13/38
[52] U.S. Cl. .......................................... 190/1; 190/8; 190/18 A; 190/111; 190/113; 280/37
[58] Field of Search ............. 190/1, 15.1, 18 R, 18 A, 190/108, 12 A, 8, 111, 113; 280/37, 47.18, 47.38

[56] References Cited

U.S. PATENT DOCUMENTS

| 841,992 | 1/1907 | Lundstrom | 190/12 |
|---|---|---|---|
| 1,503,714 | 8/1924 | Schnipper et al. | 280/37 |
| 2,170,227 | 8/1939 | Weber | 280/37 |
| 2,456,932 | 12/1948 | Dostal | 280/37 |
| 2,463,713 | 3/1949 | Partiot | 280/37 |
| 2,472,491 | 6/1949 | Quinton | 280/37 |
| 2,581,417 | 1/1952 | Jones | 190/18 A X |
| 2,635,721 | 4/1953 | Suben | 190/18 R X |
| 3,029,915 | 4/1962 | Axtell | 190/121 X |
| 3,319,744 | 5/1967 | Smith | 190/108 |
| 3,413,011 | 11/1968 | Wettzner | 280/37 |
| 3,606,372 | 9/1971 | Browning | 190/108 X |
| 3,677,569 | 7/1972 | Larson | 280/37 X |
| 3,717,228 | 2/1973 | Blair | 190/18 A X |
| 4,228,877 | 10/1980 | Cothary | 190/18 A |
| 4,550,813 | 11/1985 | Browning | 190/18 A |
| 4,647,056 | 3/1987 | Baker | 190/18 A X |

*Primary Examiner*—William Price
*Assistant Examiner*—Sue A. Weaver

[57] ABSTRACT

A suitcase or luggage equipped with a self-contained convertible wheeled carrier is disclosed for carrying personal articles therein, when positioned in a conventional suitcase mode, while simultaneously having the mobile facility to carry additional luggage and/or other articles thereon, when converted to an additional luggage carrying mode. The suitcase includes two article holding compartments which are pivotally hinged relative to one another, and locking means for locking one compartment at a fixed angular distance from the other compartment when it is desired to convert the suitcase to an additional luggage carrying position. The suitcase further includes child carrying means, which is collapsible and concealably hidden when not in use, for carrying a small child therein.

14 Claims, 4 Drawing Sheets

LUGGAGE WITH SELF-CONTAINED CONVERTIBLE WHEELED CARRIER

Field of the Invention

The present invention relates to baggage, luggage and suitcases per se, more particularly luggage for travelers equipped with self-contained mobile carrying means for transporting luggage and/or other articles thereon when the luggage is converted to its article carrying mode.

BACKGROUND OF THE INVENTION

The utilization of wheeled suitcases and luggage have been well known for many years. Usually most wheeled luggage includes either permanently mounted, collapsible and/or concealable wheels, which when placed in their operative positions, allow a traveler to easily transport their luggage from one location to another, e.g., from an airline terminal to a taxicab stand.

For example, U.S. Pat. Nos. 2,472,491 to Quinton and 4,228,877 to Cothary, both show wheeled suitcases having concealed and collapsible wheels, the wheels being easily collapsible and hidden to a position within the suitcase when not in use. However, these above-mentioned patents make no provision for carrying or hauling additional luggage on top, within or adjacent to luggage of this wheeled type. In other words, wheeled luggage of the present day are not capable of carrying additional articles other than those already held within the luggage itself, and are not particularly adapted for transporting additional luggage or other baggage when placed on top or fastened thereto. Due to the increasing number of tourists and travelers, mainly caused by the high costs of operating automobiles and the recent low fares of air travel, obtaining aid from porters, key caps, and bellhops, is not readily available to transport traveler's baggage.

Hence, in more recent times, attempts have been made to accomodate travelers hauling more than one piece of luggage so that when moving from one location to another, a traveler can easily transport all of their baggage in one trip, easily and effortlessly. For example, the U.S. Pat. No. 4,647,056 to Baker, discloses a portable luggage carrier which is collapsible and lightweight to permit a user to place and stack luggage thereon when the carrier is in its operative position. While this type of wheeled luggage carrier is simple to erect and use, a traveler still must transport the carrier in addition to carrying other baggage, particularly when the carrier is not in use, which is generally more frequent than not. Thus, when the carrier is not in use, a user must contend with the cumbersome problem of also hauling the carrier.

Furthermore, portable carriers for transporting luggage are not specifically provided with means for seating and transporting small children, nor do these carriers incorporate compartments for holding need-to-get-to items, such as passports, licenses and tickets, which would be of great convenience to tourists and travelers especially when dragging all of their baggage from one location to another. Moreover, the portable luggage carrier, such as shown in the Baker patent, can only carry baggage when placed in its carrying position, making no essential use of the portable carrier to a traveler when the carrier is not in use.

In addition, unsuccessful attempts have been made over the years to employ wheeled carriers with folding and collapsing capabilities while simultaneously having the ability to carry personal articles therein, in other words, luggage which can be converted to a luggage carrier while maintaining its conventional use of holding personal belongings, such as clothes and bathroom accessories, in tact during travel. The U.S. Pat. Nos. 2,456,932 to Dostal and 3,677,569 to Carson, both disclose foldable vehicles which when folded to a carrying and transporting mode, have the ability for storing articles therein. However, these above-mentioned patents show foldable wheeled carriers which when placed in a non-operative position, greatly reduce the volume of space to store articles due to the foldable components of the vehicle's body during idle conditions. Further, these convertible carriers of the wheeled type, prohibit storage of personal items within the carrier during the operation of the carrier in its carrying mode. The above-discussed Larson patent, illustrates a foldable wheeled vehicle for providing a workman's crawler when the vehicle is in an open, unfolded position, and a tool carrying box when the vehicle is in a closed, folded position. Unfortunately, when the vehicle is in the crawler mode, the tools once held within the vehicle must be removed to allow a workman to use the crawler, thereby preventing the simultaneous capability of the device to carry both a workman and his tools.

Moreover, no prior luggage or suitcase has previously been available which can simultaneously provide both luggage carrying means for carrying luggage thereon when the luggage is converted to a luggage carrying position and having the conventional ability to store and carry personal articles therein. There is a great need for a suitcase having a self-contained wheeled carrier for carrying other baggage thereon while including conventional ability to store clothes and other personal articles therein, regardless of the position of the carrying means, especially when the carrying means is in an inoperative position. Furthermore, the use of a lightweight and easily foldable suitcase incorporated with a concealable, self-contained and convertible carrier, would be extremely helpful to all travelers, particularly to those traveling with more than one piece of luggage. Additionally, luggage equipped with convertible carriers having the facility to carry small children as well as other luggage, would be of great advantage and importance. Hence, a combined suitcase and portable carrier could greatly benefit travelers throughout the world.

SUMMARY OF THE INVENTION

Accordingly, it is an object of the present invention to overcome the deficiencies of the prior art, such as those set forth hereinabove.

It is another object of the present invention to provide travelers and tourists with improved luggage and luggage handling means.

It is a further object of the present invention to provide luggage with a self-contained and convertible wheeled carrier for carrying additional luggage thereon.

It is yet another object of the present invention to provide luggage which can simultaneously provide both luggage carrying means and the ability to store personal articles therein regardless of the position of the luggage carrying means.

It is still another object of the present invention to provide a suitcase or the like with concealable luggage carrying means for carrying additional luggage thereon when the suitcase is in its unconcealed carrying mode.

It is another object of the present invention to provide luggage with built-in and convertible luggage carrying means having additional personal article holding compartments and means for seating and transporting small children, both of which are easily accessible to by a user when the luggage is converted to its luggage carrying position.

It is still another object of the present invention to provide an easily collapsible and concealable luggage carrier within a suitcase or the like.

It is another object of the present invention to provide new and improved latch means for easily converting luggage with self-contained luggage carrying means to a luggage carrying position, and vice versa.

It is still another object of the present invention to provide tourists and travelers with improved foldable luggage.

It is another object of the present invention to provide a combined suitcase and portable luggage carrier which is lightweight and inexpensive to manufacture.

It is still another object of the present invention to provide luggage with self-contained and convertible wheeled luggage carrying means, including a first handle for carrying the luggage when being conventionally used, and a second handle for allowing a user to transport the luggage/carrier when in its luggage carrying operation.

Still other objects, features and attendant advantages of the present invention will become apparent from a reading of the following detailed description of embodiments constructed in accordance therewith, taken in conjunction with the accompanying drawings.

DESCRIPTION OF THE PREFERRED EMBODIMENT

The presently preferred embodiment of the luggage is illustrated in FIGS. 1-4 of the drawings, and comprises a first article holding compartment 10, a second article holding compartment 12, being pivotally hinged to the first article holding compartment 10 about a hinge 20, the second compartment 12 including a plurality of castor wheels 40,40 and 42,42, and a collapsible small child-seating region 46 integral with the first article holding compartment 10.

Figure 1:
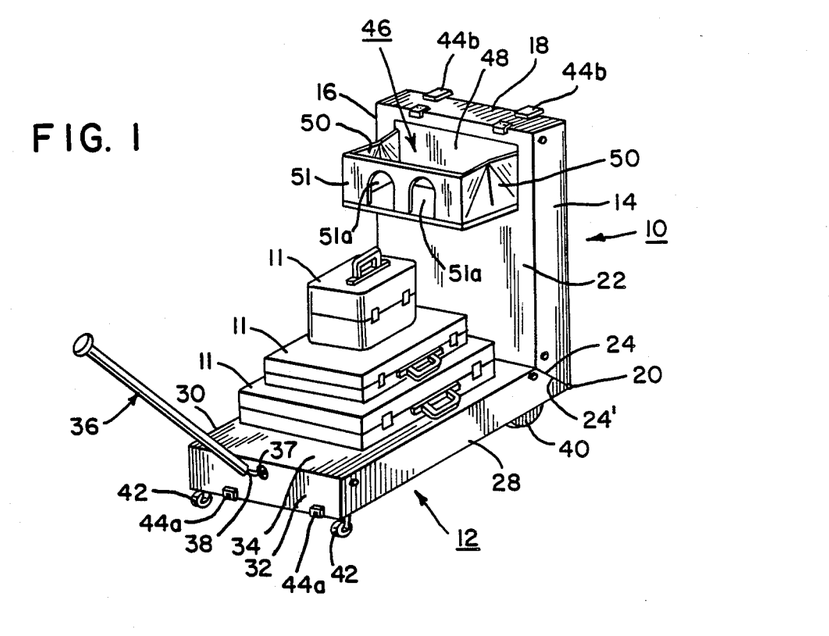
FIG. 1 is a perspective view of the luggage of the present invention, showing the luggage in its luggage carrying position.
Figure 3:
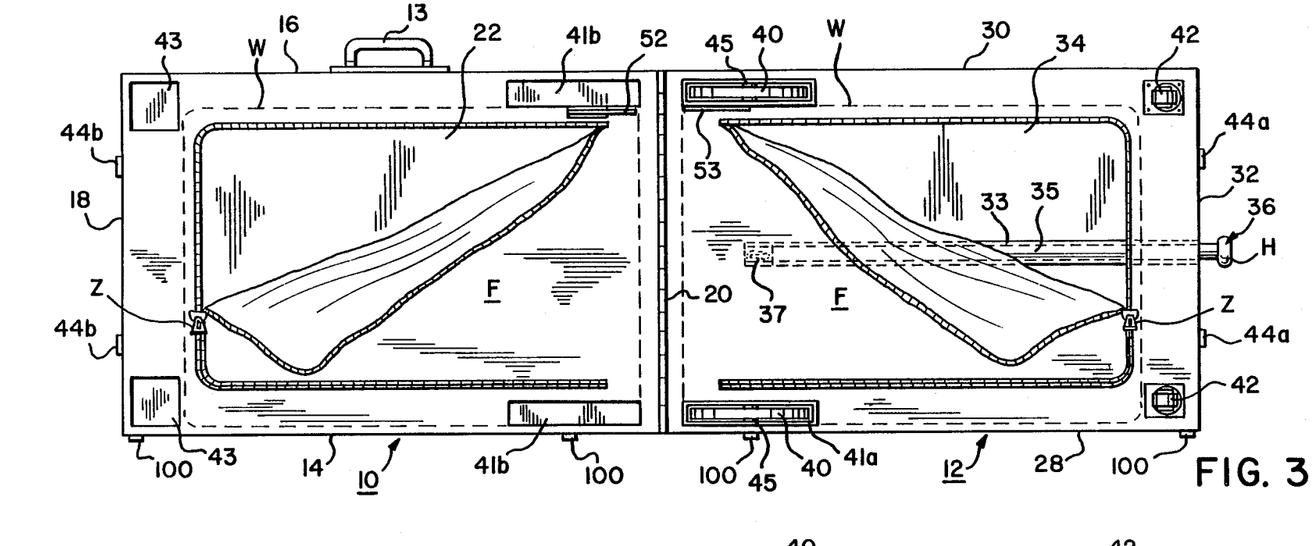
FIG. 3 is a plan view of the luggage of the present invention, showing the luggage in an unfolded position.
Figure 4:
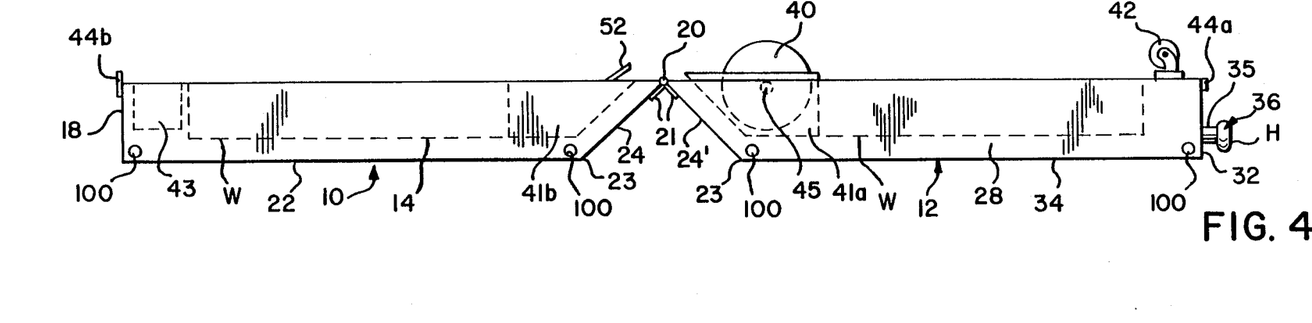
FIG. 4 is an elevational view of the luggage of the present invention shown in its unfolded position.

As best illustrated in FIG. 1, the luggage is shown in a luggage carrying position, compartment 12 being in an inverted position so as to allow for the placement of additional luggage or suitcases 11 thereon, while FIGS. 3 and 4, display the same luggage unfolded to a conventional suitcase which can transport and carry typical personal articles, such as clothes and bathroom accessories. Compartment 10 includes a small child-seating region which is collapsibly hidden within a wall 22 of the compartment 10.

Compartments 10 and 12 are preferably of rectangular configuration and are suitably made from wooden frame members W having a highly tear-resistant fabric covering F, such as canvas, it being understood that other materials such as lightweight metals and plastics could be suitably employed in place of the wooden frame members, as well as other fabrics, other than canvas, being employed for covering the frame members; wood and canvas are preferred, respectively.

First compartment 10 includes a bottom wall 22, vertically erect side walls 14,16 being generally perpendicular to bottom wall 22, a first end wall 18 generally normal to the bottom and side walls, and a second, substantially slanted, end wall 24 opposing the end wall 18 and being generally normal to the side walls 14,16. Slanted end wall 24 is positionably mounted to the bottom and side walls, at a substantially 45° angle relative to a plane defined by the bottom wall 22, the bottom wall 22 meeting slanted end wall 24 substantially along edge 23. Likewise, second compartment 12 includes a bottom wall 34, vertically erect side walls 28,30 being generally perpendicular to bottom wall 34, a first end wall 32 generally normal to the bottom and side walls, and a second substantially slanted, end wall 24' opposing the end wall 32 and being generally normal to the side walls 28,30. Slanted end wall 24' is positionably mounted to the bottom and side walls, at a substantially 45° angle relative to a plane defined by the bottom wall 34, the bottom wall 34 meeting end wall 24' substantially along edge 23'.

The fabric covering F, of both the first and second compartments 10,12, is particularly adapted to enclose and cover the entire compartmented assemblies, and having a suitably shaped opening therethrough near its center on the side opposing the bottom walls. The openings may include typical zipper devices Z,Z for closing the compartments and may be rectangular in shape (other shapes may also be suited; a rectangular opening is preferred). The zippers Z,Z permit easy access to articles contained within the compartments.

Second compartment 12, in its side walls 28,30, include two opposing large wheel-receiving wells 41a, 41a which are adapted to receive two large castor wheels 40,40, respectively. Each wheel 40,40 can be easily mounted for rotation about wheel axles 45,45 positioned within the wells 41a, 41a. Each wheel well 41a, 41a is adapted to support a wheel therein at a position in which the wheels protrude approximately one-half their diameter above the fabric covering of the compartment. The wheel wells 41a, 41a are preferably located adjacent to or near the compartment's slanted end wall 24'. In addition, the compartment side walls 28,30, can also include two opposing smaller caster wheels 42,42 which are positionably mounted adjacent to or near the compartment's first end wall 32. It should be understood that while the larger caster wheels 40,40 are equipped with wheel receiving wells, it may also be possible to incorporate wheel receiving wells for the smaller castor wheels 42,42 (not shown). In the preferred embodiment, castor wheels 42,42 are directly mounted to the top of the wooden frame members (see FIG. 4). Wheels 40,40,42,42 may be made of sturdy lightweight plastic materials, but it should be understood that any sturdy rigid lightweight material, such as, aluminum or stainless steel, could also be suitably employed.

The first compartment 10 in its side walls 14,16 include two opposing large wheel receiving cavities 41b, 41b located near or adjacent to the slanted end wall 24 of the compartment 10, and two opposing small wheel receiving cavities 43,43 located near or adjacent to the end wall 18 of compartment 10, all wheel cavities being in a position to receive the wheels 40,40,42,42 when the second compartment 12 is folded upon the first compartment 10. It should be understood that all of the wheel receiving cavities are deep enough such that they are able to receive the portion of the wheels 40,40,42,42 protruding above or mounted to the fabric cover and wooden frame of the compartment 12. Additionally, compartment 10 may be provided with a protruding guide pin 52, located adjacent to at least one of the wheel-receiving cavities 41b, to facilitate alignment of the compartments during the closing/folding of the same. A slot 53 is incorporated in compartment 12 at a position directly opposing guide pin 52 for receiving the guide pin 52 therein. Furthermore, it should be understood that various other positions of the wheels and wheel receiving cavities may be possible, as long as the wheels on the side walls of the second compartment 12 are at relative corresponding distances from the wheel receiving cavities provided on the side walls of the first compartment 10, so as to permit flush and convenient closing of the luggage compartments. Each wheel receiving cavity 41n, 41b, 43,43 are generally cut-out of the wooden frame members via typical woodworking tools, and are overlaid with the tear-resistant fabric covering F. Likewise, wheel wells 41a, 41a of the second compartment 12, are also easily cut-out of the wooden frame members via typical woodworking tools.

Each compartment 10,12 may be equipped with adhesively attached plastic bumpers 100, 100, 100, 100 which are generally positioned along the length of the compartment side walls to prevent inadvertent tearing or scarring of the compartments' fabric overlay during handling of the luggage. It should be understood that various other materials could be utilized, such as, rubber or wood, as long as the material exhibits rigidity and is not readily deformable so as to absorb shocks caused by dropping the luggage or the like.

Figure 6:
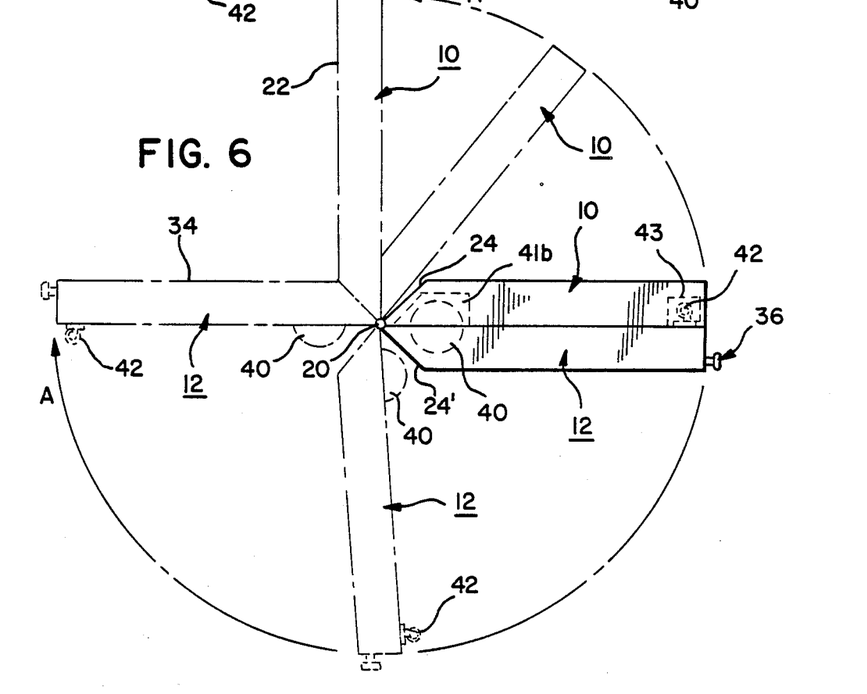
FIG. 6 is an elevational diagrammatic view of the luggage of the present invention, the direction of arrows A,A simulating the luggage's convertibility from a folded conventional position to an open luggage carrying position.

Referring now to FIGS. 3, 4 and 6 of the drawings, first compartment 10 and second compartment 12 are connected together and are pivotable about a hinge 20, hinge 20 having two conventional leaves 21,21 integral therewith. The hinge 20 is secured along an axis parallel and adjacent to the compartments' slanted end walls 24,24', the hinge being generally disposed between the uppermost portions of the compartment's slanted end walls. Thus, when the compartments are laid open on a planar surface and are connected to one another, an inverted V-shaped cross-sectional region is formed between the first and second compartments 10,12 extending generally from one side wall to the other opposing side wall. Each leaf 21,21 may be securely mounted to the compartments' opposing slanted end walls 24,24' and are generally flush with the slanted walls' exterior surfaces. Hence, the hinge not only connects the two compartments in a generally side-by-side longitudinal formation (see FIGS. 3 and 4), but also permits pivotal movement of the compartments relative to one another about the longitudinal axis of the hinge. As best illustrated in FIG. 6 of the drawings, and generally shown by the direction of arrows A,A, the luggage of the present invention can easily be converted from a folded conventional position to an unfolded luggage carrying position. The luggage, when in its conventional article holding position, easily conceals the castor wheels 40,42 within the side walls of the first and second compartments 10,12. However, when the luggage is in its luggage carrying position, compartment 12 is swung to a 180° position relative to its normal position, thus inverting compartment 12 to expose and place wheels 40,42 in their operative positions. Compartment 10 is swung to a 45° position relative to its normal position and generally is fixed at a right angle to compartment 12 when in the luggage carrying mode. When the luggage is in its luggage carrying mode (see FIG. 1 as well), the bottom wall 34 of compartment 12 essentially becomes the top wall of compartment 12 when inverted from its normally upright position. Thus, surface or wall 34 actually defines a luggage carrying surface facilitating a region for travelers to place additional luggage 11 thereon. Furthermore, the bottom wall 22 of compartment 10, actually becomes a vertically upstanding surface when compartment 10 is swung and positioned at a 90° angle relative to compartment 12, the wall 22 thereby facilitating a back stop means for piling luggage 11 thereagainst when the luggage is converted to its luggage carrying mode. It should be understood that when the luggage is converted to its luggage carrying position, the slanted end walls 24,24' of the respective compartments, readily become flush with one another in an opposing relationship, allowing forces exerted on surfaces 22 and 34, caused by luggage weight and handling by travelers, to be transmitted to the flush faces of slanted walls 24,24'.

Figure 2:
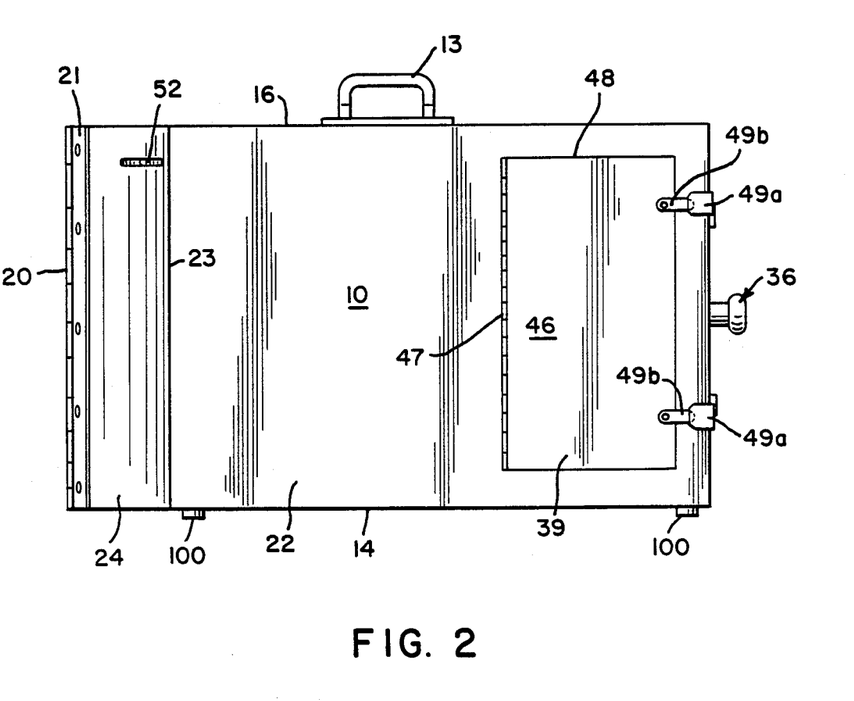
FIG. 2 is a plan view of the luggage of the present invention, illustrating the luggage folded in its conventional carrying position.
Figures 5A, 7:
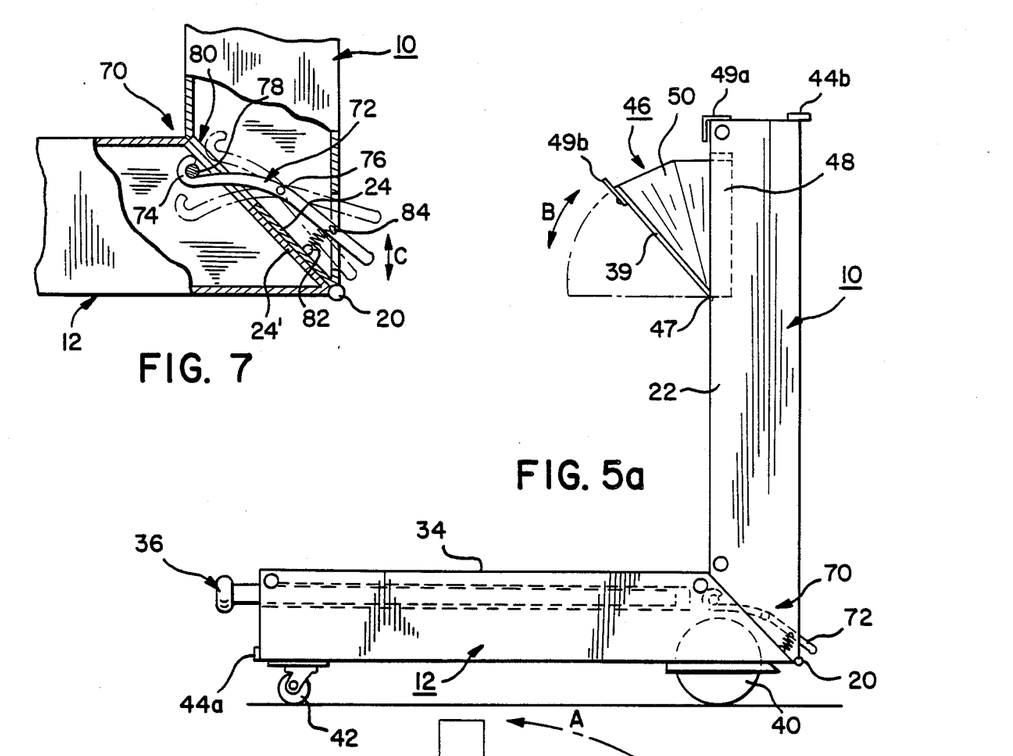
FIG. 5a is an elevational view of the luggage carrying means employed in the present invention, showing the luggage carrying means in its operative position.
FIG. 7 is a partial sectional view of the latch mechanism employed in the present invention.

The bottom wall or vertically upstanding surface 22 of the first compartment 10 includes a collapsible small child seating and carrying means 46 for carrying a small child therein when the luggage is in its luggage carrying position (see FIGS. 1, 2 and 5a). The child seating and carrying means is provided with a pivotally swingable door or bottom wall 39, two opposing vertically erect side walls 50,50, the side walls being in a plane subsequently perpendicular to the bottom wall 39 when the child carrying means is in use, and an end wall 51 integrally disposed between the side walls 50,50 and being in a plane substantially normal to the side walls 50,50 and the bottom wall 39 (also when the child carrying means is in use). The end wall 51 of a generally rectangular configuration, is provided with two, spaced-apart, generally inverted U-shaped apertures 51a, 51a for receiving the legs of a small child therethrough when the child is seated on the bottom wall 39. The bottom wall or pivotally swingable door 39 is of a generally rectangular configuration and preferably made from a metallic material, such as aluminum or stainless steel, it being understood that other materials, such as, rigid plastics or wood, could also be suitably employed. The bottom wall 39 is easily connected to wall 22 of the first compartment through the use of a hinge 47, which facilitates pivotal movement of the bottom wall 39 about the longitudinal axis of the hinge. Walls 50,50 are generally of rectangular configuration and are formed of semi-rigid materials, such as preformed cellulose products, which would permit the introduction of prearranged preformed fold lines therein, for example, a bellows type folding configuration. The bottom edges of walls 50,51,51 are generally secured to the perimeter of the top surface of the bottom wall 39 through the use of adhesives or other fastening devices such as, screw or staples; adhesive materials are preferred. As best illustrated in FIG. 5a seating and carrying means 46 is easily collapsible within a cut-out region 48 provided in wall 22 of the first compartment 10, so as to permit placement of the child seating and carrying means 46 within wall 22 when not in use. As the door or bottom wall 39 is pivotally swung about hinge 47 (see arrow B in FIG. 5a), side walls 50,50 tend to collapse, allowing end wall 51 to fold over the side walls 50,50 facilitating the child carrier 46 with collapsible characteristics which permits convenient introduction of the child carrier 46 within the cut-out portion of wall 22 of the first compartment 10. The cut-out portion 48 can easily be formed in wooden wall 22 through the use of conventional woodworking tools. To maintain the child carrier 46 within the cut-out portion 48, the bottom wall or door 39 is equipped with two pivotal type planar pins 49b, 49b which can be received within two corresponding pin receivers 49a, 49a which are mounted adjacent to the door 39 or end wall 18 of the first compartment 10. When the child carrier is in use, pins 49b, 49b are simply pivotally swung away from their respective pin receivers 49a, 49a, thus allowing door 39 to swing open about hinge 47 (see FIGS. 2 and 5a) so as to open the child carrier 46 for use. Hence, the luggage and luggage carrier not only can carry additional luggage, but can also simultaneously carry small children. Furthermore, while the child carrier, is preferably utilized for carrying children, it should be understood that the child carrier could be utilized for carrying other articles as well, such as, purses, passports, tickets and the like.

First compartment 10 also includes a first handle means 13 for permitting a traveler to carry the luggage, particularly when the luggage is in a folded conventional carrying mode (see FIGS. 2 and 3). The first handle 13 of a generally U-shaped configuration, can easily be mounted to the surface of side wall 16 of the first compartment 10 by use of screws or the like. It should be understood that the handle 13 may be mounted to other surfaces provided either on the first compartment 10 or on the second compartment 12, as long as the handle is in a convenient position to permit a traveler to easily carry the luggage when the luggage is in its conventional article carrying mode. Various other handle arrangements may also be possible, such as, a circularly shaped handle or a linearly shaped handle.

Figures 5B, 8A, 8B, 8C, 9:
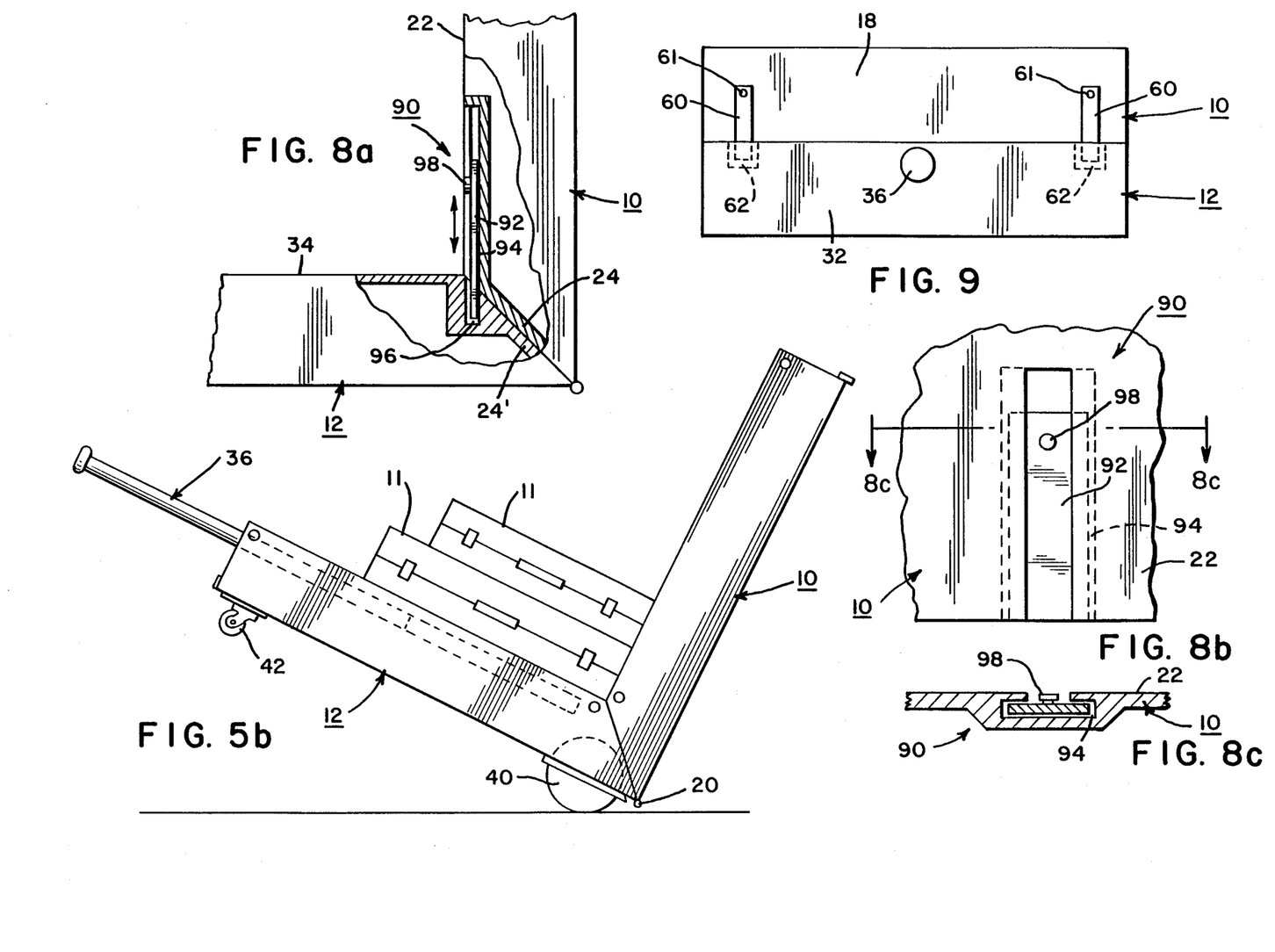
FIG. 5b is an elevational view of the luggage carrying means shown in its traveling position.
FIG. 8a is a partial sectional view of an alternate latch mechanism employed in the present invention.
FIG. 8b is an elevational view of the alternate latch mechanism employed in the present invention.
FIG. 8c is a cross-sectional view of the alternate latch mechanism taken along line 8c—8c in FIG. 8b.
FIG. 9 is an elevational view of the luggage of the present invention, showing an alternate locking device for fastening the luggage in a closed, folded, conventional position.

Referring now to FIGS. 3 and 5b, second compartment 12 is equipped with a second handle means 36 for towing the luggage by a traveler when the luggage is converted to its luggage carrying operative position (see FIG. 5b). The handle 36 includes a substantially linear longitudinally extending rod or shaft 35 which is sleeved or telescoped within a tubular conduit 33 having generally the same length as the shaft 35. The tubular conduit 33, mounted parallel and adjacent to the bottom wall 34 of the second compartment 12, generally extends between the first end wall 32 and second, slanted end wall 24', and is generally positioned parallel to side walls 28,30. The handle 36 includes a head portion H, integrally formed to the working end of shaft 35, and a chain or rope 37, fastened via hooks 38 to the distal end of shaft 35. Thus, when it is desired to tow or pull the luggage, when in its luggage carrying position, a traveler simply pulls the head H of the handle 36 to remove the shaft portion 35 from within its tubular conduit 33. The handle 36 is generally positioned to be withdrawn through the first end wall 32 of the second compartment 12. If, for example, the luggage is converted back to its conventional article carrying mode, than second handle means 36 can be easily and conveniently stored within sleeve or tubular conduit 33 when not in use. As best shown in FIG. 5b, the luggage, when in its luggage carrying mode, can be pulled/towed by a traveler without having the cumbersome problem of lifting the luggage carrier. Tall users may have a tendency to raise the front portion of the second compartment 12, in other words, the small castor wheels 42,42 may be elevated to a position above the floor, but even at this position, substantially all of the weight of the luggage 11 would still be directed towards the larger castor wheels 40,40, and would conveniently shift the luggage and its weight thereon substantially against wall 22 of the first compartment 10. It should be understood that various other handle towing arrangements are possible, such as a concealable rope which could be easily withdrawn from a convenient location within compartment 12. In addition, while the present invention is directed to a towable or pullable luggage assembly, it should be understood that the luggage when in its luggage carrying position, could easily and without much difficulty be pushed from behind, in orther words, a user could simply push against first compartment 10 in a direction of desired travel.

The luggage may also include conventional fastening means 44a, 44a, 44b, 44b for closing and locking the luggage compartments together when the luggage is in a folded conventional article carrying position. First end wall 32 of the second compartment 12 is equipped with two spaced apart lower hasps 44a, 44a, and the first end wall 18 of the first compartment 10, is equipped with two corresponding equally spaced apart upper hasps 44b, 44b, which are adapted to engage lower hasps 44a, 44a as is known to the art. Any suitable known hasp means may be employed. In an alternate embodiment, shown specifically in FIG. 9, the fastening means may include two spaced apart pivotal planar pins 60,60 which can be directly mounted to the first end wall 18 of first compartment 10 via screws or rivets 61,61, the pins 60,60 being generally pivotable about the longitudinal axes of the screws 61,61. The pins 60,60 are adapted to be received within two spaced apart corresponding cut-out regions 62,62, generally positioned within the first end wall 32 of the second compartment 12, which receive the uppermost portion of the planar pins 60,60 therein. It should be understood that the planar pins are preferably formed of semi-flexible material, such as aluminum or the like, so as to allow the pins some bending properties to facilitate pin removal and placement within the cut-out regions 62,62. Thus, removal of the pins would open the compartments to an unfolded position, and insertion of the pins within the cut-out regions, would close the compartments to a folded condition.

Referring now to FIGS. 5a and 7 of the drawings, a preferred embodiment of the latch locking means 70, for converting and maintaining first compartment 10 at a right angle relative to second compartment 12 when the luggage is in its luggage carrying mode, is generally positioned at the junction of the slanted end walls 24, 24' of their respective compartments. Each slanted wall is provided with apertures which oppose one another to form a single aligned hole 80 through both slanted walls. Positioned adjacent or near to the opening of slanted end wall 24' of the second compartment 12, is a pin 78 which extends generally perpendicular to the side walls of the compartment and is preferably adapted to extend from one side wall to approximately one-fourth the distance between the side walls. A generally linear hook 72, equipped with an integrally formed C-shaped end 74, includes a spring 82 which extends between the slanted wall 24 and a spring retaining aperture 84 provided near the end of the hook 72 opposing the C-shaped end 74, to normally urge the hook 72 in a downward direction towards the slanted end wall 24. The hook 72 also includes a centrally located pivot pin 76 which permits the hook to be pivotably swung about the longitudinal axis of the pivot pin 76. The pivot pin 76 may be mounted directly to a side wall of compartment 10, but should always be directly opposing pin 78 located in compartment 12.

In operation, when it is desired to convert the luggage from a conventional article carrying position to a luggage carrying position, the end opposing the C-shaped end of the hook 72, is either raised or lowered (in directions indicated by arrow C) by a user to manipulate the C-shaped end of the hook into engagement with the pin 78, thus locking the first compartment 10 at a 90° angle relative to the second compartment 12. When converting the luggage back to its conventional article carrying mode, the hook 72 is either raised or lowered to manipulate the C-shaped end 74 out of engagement with pin 78, thereby allowing a user to pivotally swing compartment 10 to a conventional folded position, such as shown in FIG. 6.

In an alternate embodiment shown in FIGS. 8a–8c, the latch locking means 90 includes a planar type bolt assembly. Latch locking means 90 is equipped with a slideable bolt 92 which is reciprocally positioned within a C-shaped crosssectional channel 94 which extends from wall 22 of compartment 10 through apertures provided at the junction of the slanted end walls 24,24' to an aligned bolt receiving aperture 96 provided in compartment 12. The bolt may be either raised or lowered (such as indicated by arrow D) by a user, via an integrally formed bolt handle 98, to either position the bolt in registry with the bolt receiving aperture 96 or out of registry with the bolt receiving aperture 96. Hence, if it is desired to place the luggage in a luggage carrying mode, a user simply pulls down on the bolt to place the bolt within the bolt receiving aperture 96 to lock compartment 10 at a 90° angle relative to compartment 12.

In general, it can be seen that the luggage of the present invention can simultaneously carry personal articles therein, such as a conventional luggage, while providing means for converting the luggage to an additional luggage carrier. Furthermore, the luggage of the present invention can easily seat and carry a small child, particularly when the luggage is converted to a luggage carrying mode.

It should be understood that various other arrangements of the luggage compartments are possible. For example, each compartment could be square or circularly shaped in configuration as long as at least one end thereof is pivotally hinged to permit a user to swing one compartment to an angle of 90° relative to the other.

It will be obvious to those skilled in the art that various other changes and modifications may be made without departing from the scope of the invention and the invention is not to be considered limited to what is shown in the drawings and described in the specifications.

I claim:

1. A suitcase, primarily useful for holding articles therein while simultaneously having convertible mobile facility to carry additional luggage and/or other articles thereon, comprising: a first article holding compartment, a second article holding compartment; access means for opening and closing each of said holding compartments; a single hinge means, having a longitudinal axis and positioned between and abutting said first and second article holding compartments, for pivotally connecting said first article holding compartment to said second article holding compartment, said first and second article holding compartments being pivotable relative to one another normal to and about said longitudinal axis; means, integral with said first and second article holding compartments, for releasably locking said first and second compartments at a fixed angular distance from one another in an abutting relationship and while said first and second article holding compartments are closed; means, integral with said second article holding compartment, for facilitating mobility of said first and second article holding compartments; and convertible luggage carrying means, defined by a region formed between and adjacent to said first and second article holding compartments when said first article holding compartment is locked at a fixed angular distance from said second article holding compartment, for carrying additional luggage and/or other articles when placed in said region, said first and second article holding compartments being closable compartments when said first and second article holding compartments are positioned to the convertible luggage carrying means.

2. A suitcase in accordance with claim 1, wherein said means, integral with said second article holding compartment, for facilitating mobility of said first and second article holding compartments, comprises at least two spaced apart wheels.

3. A suitcase in accordance with claim 2, wherein said spaced apart wheels are rotatably mounted within wheel cavities provided in said second article holding compartment, said wheels being partially positioned within said wheel cavities.

4. A suitcase in accordance with claim 1, wherein said first article holding compartment further comprises means for concealing said mobile means, integral with said second article holding compartment, within said first article holding compartment when said second article holding compartment is pivoted to a position folded upon said first article holding compartment.

5. A suitcase in accordance with claim 1, wherein said first article holding compartment comprises an integrally attached, concealable and collapsible child seating and carrying means for transporting a child therein.

6. A suitcase in accordance with claim 5, wherein said child carrying means further comprises locking means for locking said child carrying means in a closed concealed position within said first article holding compartment.

7. A suitcase in accordance with claim 1, further comprising a first handle means for carrying said suitcase when positioned in a conventional carrying mode, and a second handle means for carrying said suitcase when converted to an additional luggage carrying mode.

8. A suitcase in accordance with claim 7, wherein said first handle means comprises a U-shaped handle.

9. A suitcase in accordance with claim 1, further comprising suitcase closing and locking means for locking said first and second article holding compartments when said first article holding compartment is folded upon said second article holding compartment.

10. A suitcase in accordance with claim 1, wherein said means for releasably locking said first and second compartments comprises a slideable bolt device.

11. A suitcase in accordance with claim 1, wherein said means for releasably locking said first and second compartments comprises a pin and a pivotally engaging pin member, said member including at least a hook portion for engaging said pin.

12. A suitcase in accordance with claim 1, wherein said fixed angular distance is 90°.

13. A suitcase in accordance with claim 1, wherein said first and second article holding compartments each comprise at least one slanted end wall; said slanted end walls opposing each other about said single hinge means at a substantially 45° angle relative to the opposing said article holding compartment.

14. A suitcase in accordance with claim 1, wherein said access means comprise closable fabric coverings.

* * * * *